US007206389B1

(12) United States Patent
Dumoulin et al.

(10) Patent No.: US 7,206,389 B1
(45) Date of Patent: Apr. 17, 2007

(54) METHOD AND APPARATUS FOR GENERATING A SPEECH-RECOGNITION-BASED CALL-ROUTING SYSTEM

(75) Inventors: Benoit Dumoulin, Quebec (CA); Dominic Lavoie, Saint-Laurent (CA); Real Tremblay, Outremont (CA); Ben Shahshahani, Capitola, CA (US); Remi Ken-Sho Kwan, Hudson (CA)

(73) Assignee: Nuance Communications, Inc., Menlo Park, CA (US)

( * ) Notice: Subject to any disclaimer, the term of this patent is extended or adjusted under 35 U.S.C. 154(b) by 81 days.

(21) Appl. No.: 10/753,590

(22) Filed: Jan. 7, 2004

(51) Int. Cl.
*H04M 1/64* (2006.01)
(52) U.S. Cl. .............................. 379/88.04; 379/218.01; 704/234
(58) Field of Classification Search ............. 379/88.01, 379/88.03, 88.04; 704/222, 234, 256.5
See application file for complete search history.

(56) References Cited

U.S. PATENT DOCUMENTS

| 5,638,425 | A | * | 6/1997 | Meador et al. .......... 379/88.01 |
| 5,812,972 | A | * | 9/1998 | Juang et al. ................ 704/234 |
| 5,991,720 | A | * | 11/1999 | Galler et al. ............. 704/256.5 |
| 6,253,173 | B1 | * | 6/2001 | Ma ........................... 704/222 |
| 6,404,876 | B1 | * | 6/2002 | Smith et al. ........... 379/218.01 |

OTHER PUBLICATIONS

Chu-Carroll, J. and Carpenter, B. (1999) "Vector-Based Natural Language Call Routing," Association for Computational Linguistics, 2-27.
Gorin, A. L. (1996) "Processing of Semantic Information in Fluently Spoken Language," Proc. of ICSLP, Philadelphia, 1-4.
Kuo, H.K.J. and Lee, C.H. "Discriminative Training in Natural Language Call Routing," Proc. of ICSLP, Beijing, China, Oct. 2000. 4 pages total.
Kuo, H.K.J. and Lee, C.H. (2003) "Discriminative Training of Natural Language Call Routers," IEEE Transactions on Speech and Audio Processing, vol. 11, No. 1, Jan. 2003, 24-35.
Wright, J.H. et al. (1997) "Automatic Acquisition of Salient Grammar Fragments for Call-Type Classification," Eurospeech 1997, 4 pages total.

* cited by examiner

*Primary Examiner*—Gerald Gauthier
(74) *Attorney, Agent, or Firm*—Townsend and Townsend and Crew LLP (57) ABSTRACT

A computerized method is provided for electronically directing a call to a class, such that an utterance spoken by a speaker and received by a call-routing system is classified by the call-routing system as being associated with the class, such that the call-routing system includes a speech-recognition module, a feature-extraction module, and a classification module. The method includes extracting features from recognized speech; weighting elements of a feature vector with respective speech-recognition scores, wherein each weighting element is associated with one of the features; ranking classes to which the features are associated; and electronically directing the call to a highest-ranking class.

30 Claims, 11 Drawing Sheets

|                          | V1 | V2 | V3 | V4 |
|--------------------------|----|----|----|----|
| account balance          | 1  | 1  | 1  | 1  |
| checking account         | 1  | 1  | 1  | 1  |
| savings account          | 0  | 0  | 0  | 0  |
| address change           | 0  | 0  | 0  | 0  |
| account number           | 0  | 0  | 0  | 0  |
| checking account balance | 0  | 0  | 0  | 0  |
| deposit to checking      | 0  | 0  | 0  | 0  |
| withdrawal               | 0  | 0  | 0  | 0  |
| transfer funds           | 0  | 0  | 0  | 0  |
| deposit a check          | 0  | 0  | 0  | 0  |
| check                    | 1  | 1  | 1  | 1  |
| want to check            | 0  | 0  | 0  | 0  |
| like to check            | 0  | 1  | 1  | 1  |

METHOD AND APPARATUS FOR GENERATING A SPEECH-RECOGNITION-BASED CALL-ROUTING SYSTEM

CROSS-REFERENCE TO RELATED APPLICATION

The following related patent applications filed on the same day herewith are hereby incorporated by reference in their entirety for all purposes:

U.S. patent application Ser. No. 10/753,645, titled "Method and Apparatus for Generating a Speech-Recognition-Based Call-Routing System," of Benoit Dumoulin et al; and U.S. patent application Ser. No. 10/753,311, titled "Method and Apparatus for Generating a Speech-Recognition-Based Call-Routing System," of Real Tremblay et al.

BACKGROUND OF THE INVENTION

This invention relates generally to a speech-recognition-based call-routing method and system configured to classify and route calls, such that the speech-recognition-based call-routing system is trained with utterances spoken by speakers and features of interest are automatically identified and extracted from the utterances.

Speech-recognition-based call-routing systems are typically used to collect utterances spoken by a caller and, based on the utterances to direct the caller's call to a class from a predetermined set of classes. A class is a categorization having a title, a destination, and attributes. Utterances spoken by a speaker are typically converted by a speech-recognition system associated with a call-routing system (hereinafter call-routing system) into a sequence of words, which can then be classified so that the caller's call may be routed to an appropriate class. Classes to which a caller's call may be directed may comprise a pointer to a person or automatic service provider, such as a computer, that may provide the caller with requested information or services. Classes may also include portholes to question sets that are used to further route a caller's call. Classes that present questions may request spoken answers that are classified and routed by the call-routing system or they may request dual tone multi frequency (DTMF) entries, for example, entered by pushing telephone keys on a push-button telephone.

Speech-recognition-based call-routing systems are being employed in increasing numbers in business, government, and personal applications, wherein the technology is ideally transparent to the callers. For example, in a business application, such as a banking business, a caller may be prompted by a call-routing system to state the type of business or transaction the caller would like to transact with the bank. The call-routing system may ask the caller "How may I help you today?" If the caller states, "I would like to check my savings account balance," the call-routing system may route the caller's call to a class that asks the caller for her savings account number and a password and then provides the requested account balance information. Such automated call routing services provided by the call-routing system may allow a bank teller, for example, to service customers present within a bank without disrupting service to those customers by foregoing answering customers' phone calls that are answered by the call-routing system. In general, businesses employing call-routing systems can quickly direct customers' calls to appropriate classes, thereby saving the customers time and saving the businesses resources. For example, customers may save time by not being put "on hold" for extended periods of time waiting for a person to direct their call, and businesses may save money by being able to employ fewer people and by directing customers' calls efficiently to appropriate resources.

As the demand for call-routing systems increases, so too does the demand for call-routing systems that more accurately classify and route calls. Correct classification of calls saves callers and businesses resources. For example, if a call is routed by a call-routing system correctly during an initial call, the caller may be saved the time of recalling a business one or more times. Also, if a call is routed correctly during an initial call, a business is less likely to spend money on a misused resource and to lose customers. For example, businesses have a significant financial interest in calls for mundane services, which may be computer processed, not being directed to trained personnel whose misused time is relatively costly.

Accordingly, there is a need to develop call-routing systems that classify calls quickly and with high precision.

BRIEF SUMMARY OF THE INVENTION

According to the invention, a speech-recognition-based call-routing system is configured to classify and route calls, and a method is provided whereby calls are routed to destinations based on predetermined features of interest identified in utterances spoken by callers, wherein a probability model using the identified features is used to rank a number of destinations for routing or more generally for control applications.

According to one embodiment, a computerized method is provided for electronically directing a call to a class and includes extracting features from recognized speech; weighting elements of a feature vector with respective speech-recognition scores, wherein each element is associated with one of the features; ranking classes to which the features are associated; and electronically directing the call to a highest-ranking class. Ranking classes includes generating a score for each class and ranking the classes in a ranked list of the classes, and the scores are used to determine the ranking of the classes in the ranked list. Generating speech-recognition scores for the features includes generating a confidence score for each word of the recognized speech.

According to another embodiment, a method is provided and includes extracting sets of features from respective speech-recognition results; generating a feature vector for each set of features; weighting elements of each feature vector with respective weighting factors; summing the feature vectors to generate a final feature vector; ranking classes associated with the features based on the final feature vector; and electronically directing the call to a highest-ranking class.

According to another embodiment, a call-routing system is provided for electronically directing a call to a class and includes a speech-recognition module configured to generate nbest sequences of words based on an utterance spoken by a caller; a feature-extraction module configured to generate features vectors for the nbest sequences of words; and a classification module configured to form a ranked list of classes for the feature vectors and direct the call to a highest-ranking class in the ranked list of classes.

The invention will be better understood upon reference to the following detailed description in connection with the accompanying drawings and appended claims.

DESCRIPTION OF SPECIFIC EMBODIMENTS

This invention provides a speech-recognition-based call-routing system configured to classify and route calls, such that the speech-recognition-based call-routing system is trained with utterances spoken by speakers and features of interest are automatically identified and extracted from the utterances.

Embodiments of the invention are best understood by first describing a system in which embodiments of the invention may be implemented, second describing the general functionality of a speech-recognition-based call-routing system, and then describing in detail speech-recognition-based call-routing systems and methods according to embodiments of the present invention.

Figure 1:
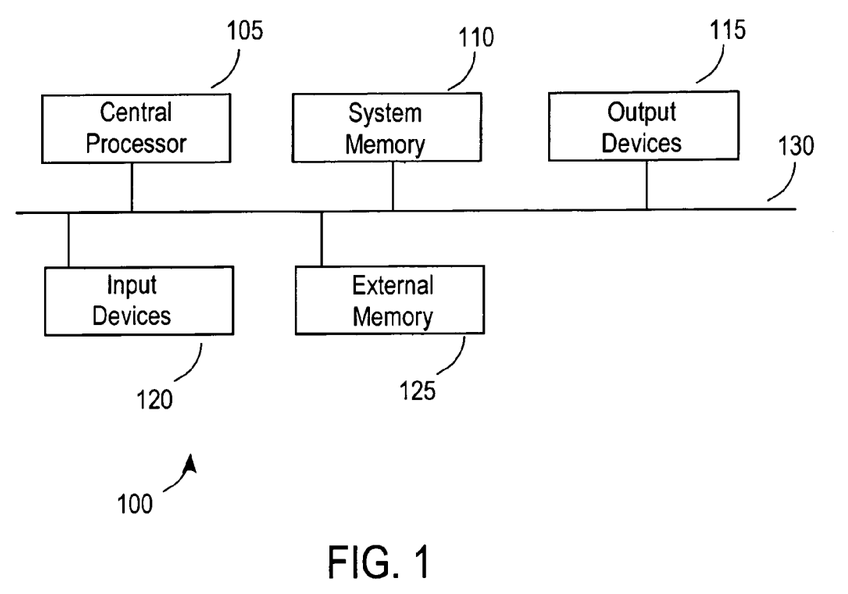
FIG. 1 is a block diagram of a computer system in which embodiments of the present invention may be implemented.

FIG. 1 is a block diagram of a computer system 100 in which embodiments of the present invention may be implemented. A specific embodiment of the invention is implemented on a computer system 100 having a processor 105, a system memory 110, output devices 115, input devices 120, a disk memory 125, and an interconnecting device 130, such as a system bus. Processor 105 may be implemented in a variety of formats, such as, but not limited to, a microprocessor, a microcontroller, a microcomputer, embedded logic or other processor types. Processor 105 may be a microprocessor manufactured, for example, by Intel Corporation, Motorola, Inc., or Advanced Micro Devices, Inc. System memory 110 may include EPROMs, EEPROMS, flash memory, SRAMs, DRAMs, cache memory or the like. Output devices 115 may include a variety of device types, such as CRTs, liquid-crystal display panels, printers, computer networks, an audio playback device and the like. Input devices 120 may include a variety of input types, such as a microphone, a keyboard, a telephone, a computer network and the like. A computer software program stored on system memory 110 and/or disk memory 125 is configured to generate machine code instructions that implement embodiments of the present invention.

Speech-recognition-based call-routing systems (hereinafter referred to as call-routing systems) are typically configured to receive an utterance from a caller and convert the utterance into a sequence of words. Features (i.e., words and/or phrases) that are predefined are then extracted from the sequence of words. The features are then classified as being associated with a class (sometimes referred to as a destination) to which the caller's call is then routed. Classes to which calls are routed may include a class configured to provide requested information or may be a portal to further requests for information from a caller. Further requested information may be for additional utterances from the caller or DTMF (dual-tone multi frequency) entrances. Additional utterances and DTMF entries may then be similarly classified and directed to other classes. The preceding simplified description of a typical call-routing system is provided for convenience as an overview of the various functions performed by call-routing systems. Each function will be described in further detail in the context of call-routing systems according to embodiments of the present invention.

Classification of Calls

Figure 2:
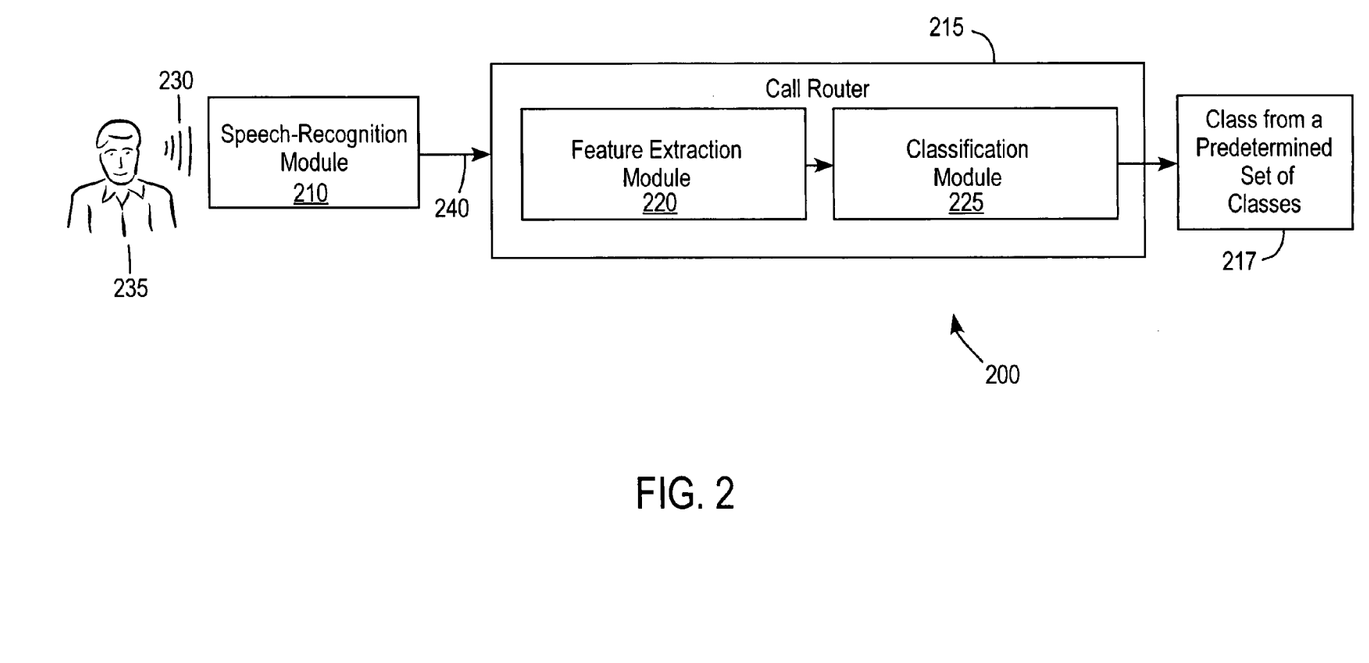
FIG. 2 is a simplified block diagram of a call-routing system illustrating a flow of information through the system for classifying and routing calls to classes according to an embodiment of the present invention.

FIG. 2 is a simplified block diagram of a call-routing system 200 illustrating a flow of information through the system for classifying and routing calls to classes according to an embodiment of the present invention. Call-routing system 200 includes a speech-recognition module 210 and a call router module 215 that is configured to classify a call as being associated with a class 217, which is selected from a set of predefined classes, and is configured to route the call to the class.

Speech-recognition module 210 is configured to receive an utterance 230 spoken by a caller 235 and to generate one or nbest sequences of words that correspond to the utterance. Nbest sequences of words include a number of sequences of words that correspond to an utterance. For example, an utterance in a banking transaction may include "I'd like to check the account balance of my checking account." A set of nbest sequences of words for this utterance may include, for example, "I want like to check the account balance of my checking account," "I would like to check the account balance of my checking account," "I'd like to check the account balance of my checking account," "I like check the account balance of my checking account" and other sequences. For convenience, one or nbest sequences of words are sometimes referred to as speech-recognition results and/or recognized speech.

Call router module 215 includes a feature-extraction module 220 and a classification module 225, which are presently described in detail. Feature-extraction module 220 is configured to receive sequences of words generated by speech-recognition module 210 and to extract features from the sequences of words. Sequences of words received feature-extraction module 220 may include one or nbest sequences of words. Features extracted from sequences of words may include words and/or phrases that are predefined. Features may be predefined for particular applications. For example, for a banking application a set of predefined features may include the features shown in Table 1.

TABLE 1 account balance
checking account
savings account
change my address
account number
checking account balance
deposit to checking
withdrawal
transfer funds
want to check
like to check
deposit a check It should be understood the features shown in Table 1 are for purposes of example and are not limiting on embodiments of the invention as recited in the claims. In view of the example features listed in Table 1, features extracted from the sequence of words "I want like to check the account balance of my checking account" may include: "like to check," "account balance," and "checking account."

Figure 3:
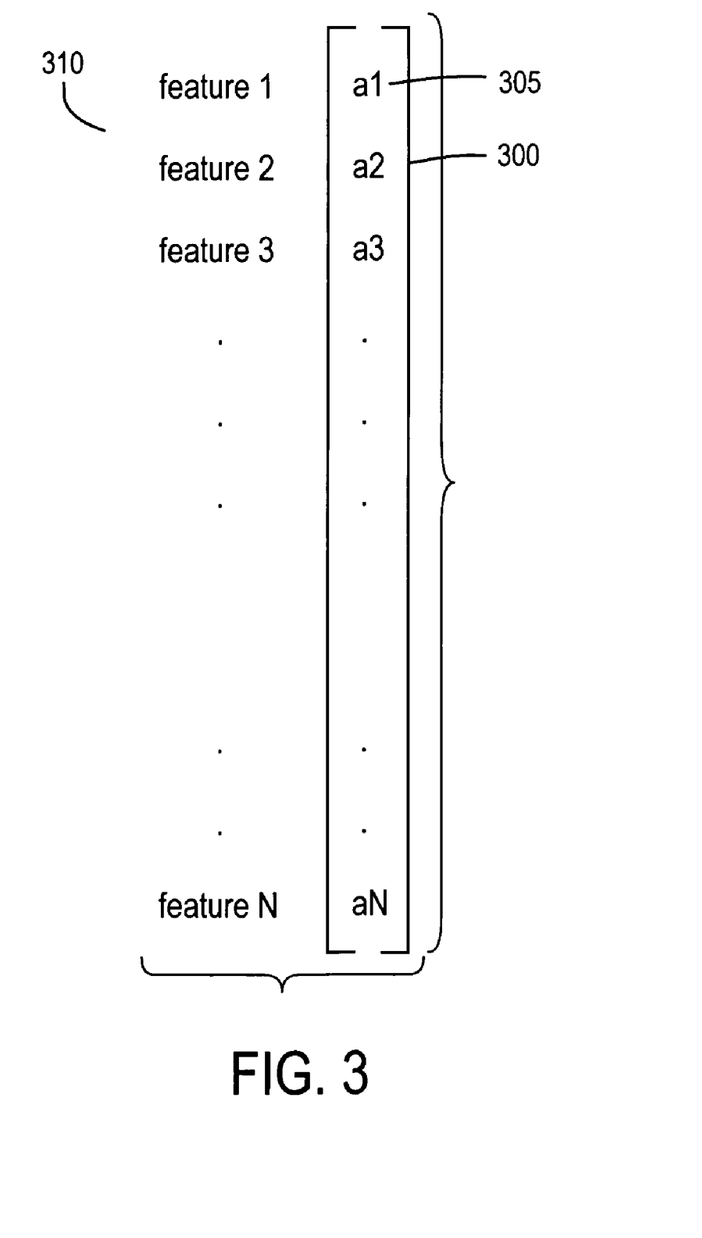
FIG. 3 shows a feature vector that includes a set of elements, labeled a1–aN, that are associated respectively with a corresponding set of features, labeled feature 1–feature N according to an embodiment of the present invention.
Figure 4:
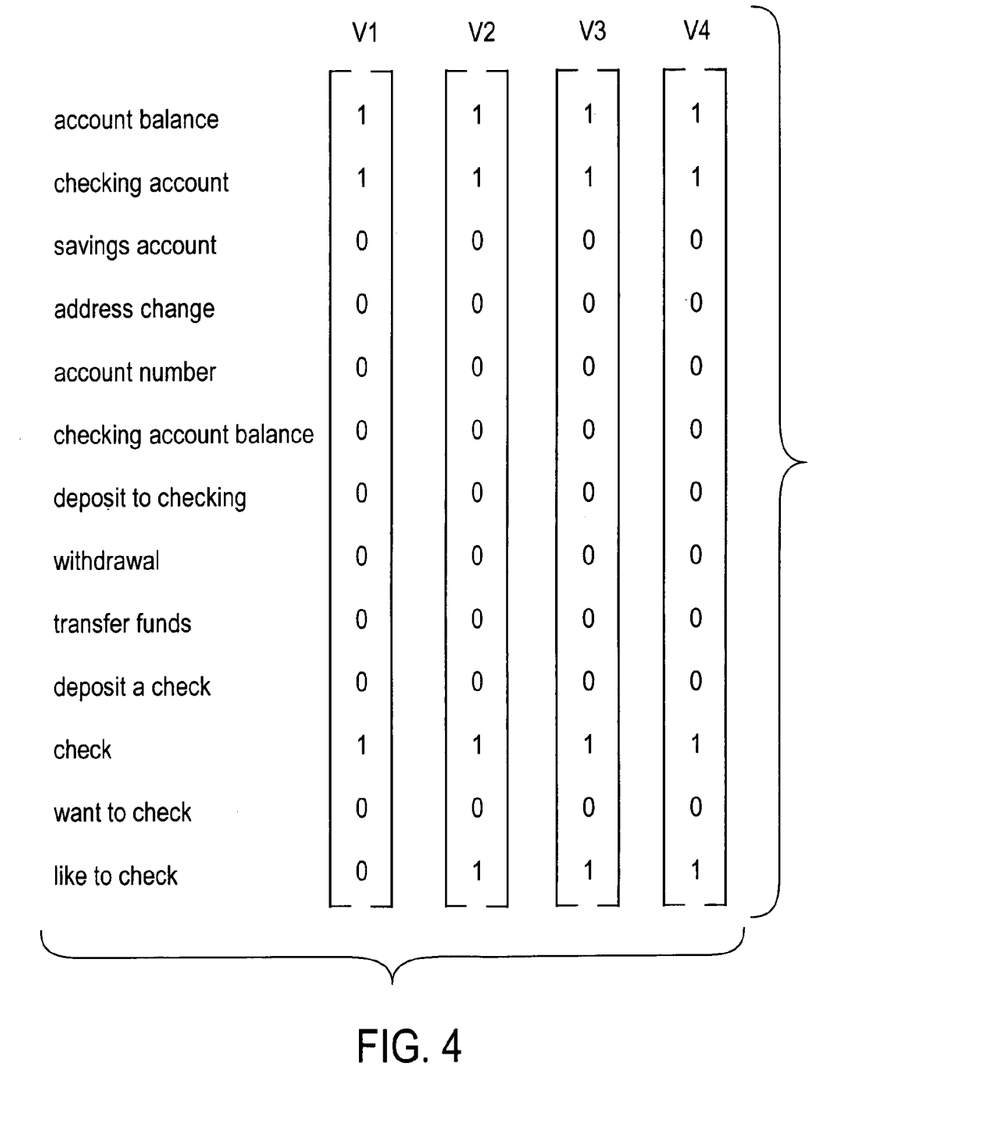
FIG. 4 shows a set of feature vectors according to an embodiment of the present invention.

Subsequent to extracting features from one or nbest sequences of words, feature-extraction module 220 generates a feature vector for each sequence of words. A feature vector includes a set of elements wherein each element is associated with a unique feature. Each feature that is predefined in a set of features is associated with an element. FIG. 3 shows a feature vector 300 that includes a set of elements 305, labeled a1–aN, that are associated respectively with a corresponding set of features 310, labeled feature 1–feature N. According to one embodiment, the elements of a feature vector are set equal to the number of times a feature occurs in a sequence of words. Alternatively, the elements of a feature vector may be a function of the number of times a feature occurs in a sequence of words. For example, the elements may be set equal to the quotient of the number of times a feature occurs in a sequence of words and the total number of words in the sequence of words. FIG. 4 shows a set of feature vectors (the feature vectors are labeled V1, V2, V3, and V4) that is associated respectively with the sequences of words "I want to check the account balance of my checking account," "I would like to check the account balance of my checking account," and "I'd like check the account balance of my checking account." The elements of feature vector V1–V4 are set equal to the number of times features from a set of predefined features (e.g., features shown in Table 1) occur in the above sequences of words.

According to one embodiment, elements of feature vectors are weighted with speech-recognition scores. Speech-recognition scores provide a relative measure of confidence that features extracted from a sequence of words match the words of an utterance. Speech-recognition module 210 is configured to generate speech-recognition scores for each word of a sequence of words. Speech-recognition scores for features that include single words may be the speech-recognition scores for the words. Speech-recognition scores for features that include phrases may be an average of the speech-recognition scores for words forming the phrases.

Speech-recognition scores are typically in the range of 0 to 1. A relatively high speech-recognition score may represent a high level of confidence that a feature matches words in an utterance, and a relatively low speech-recognition score may represent a low level of confidence of a match. For example, the sequence of words "I would like to check the account balance of my checking account" may have scores for words of the sequence that include: 0.41, 0.2, 0.82, 0.75, 0.92, 0.76, 0.68, 0.53, 0.71, 0.32, 0.94, and 0.93, respectively. Speech-recognition module 210 may be configured to generate scores for all words recognized in an utterance or may alternatively be configured to generate scores for features subsequent to being extracted by feature-extraction module 220. For example, once a feature is extracted from a sequence of words, speech-recognition module 210 may search through a waveform for the utterance that is associated with the sequence of words and locate the region for the feature. Once the region for the feature is located, the speech-recognition module may then generate confidence scores for features associated with the located region.

Figure 5:
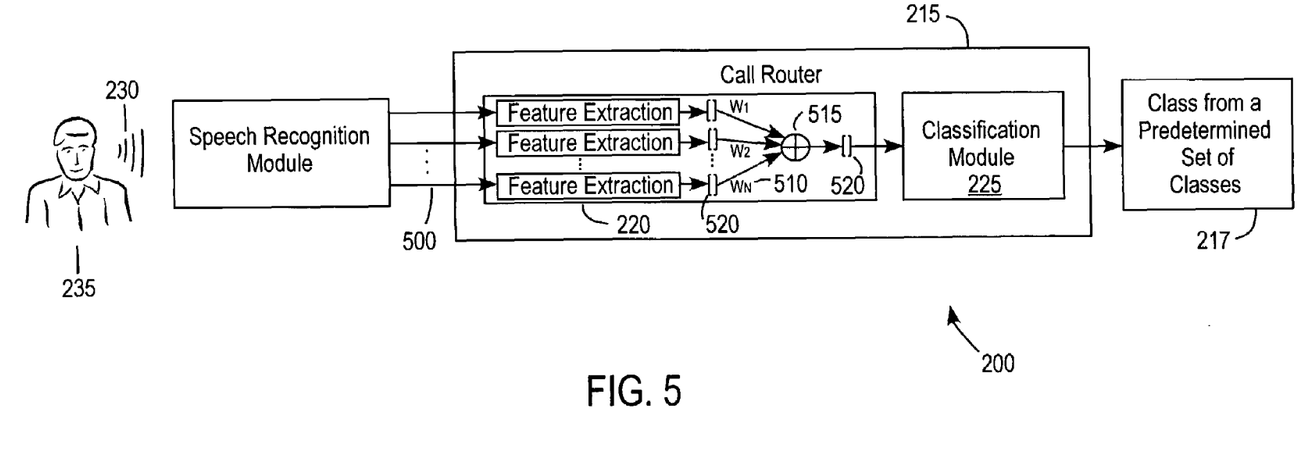
FIG. 5 is a simplified block diagram of the call-routing system illustrating a flow of nbest sequences of words through the call-routing system according to another embodiment.

As mentioned briefly above, speech-recognition module 210 may be configured to generate nbest sequences of words for an utterance. A flow of nbest sequences of words through call-routing system 200 is presently described in further detail. FIG. 5 is a simplified block diagram of call-routing system 200 showing a flow of nbest sequences of words 500 through system 200. Subsequent to the generation of nbest sequences of words 500 by speech-recognition module 210, these sequences are transferred to feature-extraction module 220, which extracts features from each of the nbest sequences of words. Subsequent to extraction of features, the feature-extraction module generates a set of feature vectors 505 that includes a unique feature vector for each sequence of words. Feature vectors are then weighted by respective weighting factors 510 (labeled $W_1$–$W_N$) and summed by a summation module 515 to form a final feature vector 520. Final feature vector 520 is transferred to classification module 225 for classification and routing.

Weighting factors used to weight the feature vectors may be derived from a function of the speech-recognition scores that are generated by speech-recognition module 210. In a particular implementation, weighting factors 510 are derived from the formula:

$$W[i] = \frac{\exp[\alpha(\text{l\_score}(i) - \max\_\text{l\_score})]}{\sum_{j=1}^{N} \exp[\alpha(\text{l\_score}(j) - \max\_\text{l\_score})]},$$

wherein l_score(i) is the speech-recognition score of for a given sequence of words for which a weight is generated, max_l_score is a maximum speech-recognition score of the nbest sequences of words, l_score(j) is the acoustic confidence for a jth nbest sequence of words, and α is parameter that may be empirically tuned.

Classification module 225 is configured to receive a feature vector, such as a final feature vector 520, from feature-extraction module 220. From the feature vector, the classification module selects a subset of classes, from a predetermined set of classes. The subset of classes includes possible classes that a call may be routed to. The classes of the subset are ranked by classification module 225 to form a ranked list. The classes of the subset may be assigned classifier scores, which determine the rank of the classes in the ranked list. Classifier scores may be generated by classifier module 220. Subsequent to ranking the classes, a caller's call is forwarded to the highest-ranking class 217. A highest-ranking class may be a class having a highest-classifier score. According to one embodiment, a ranked list of classes includes all predetermined classes and a caller's call may be forwarded to the highest-ranking class of all the predetermined classes.

Classes may be tailored for a specific application. For example, a set of classes for a banking application may include: "transfer funds from savings account to checking account," "client change of address," "savings account balance inquiry," "checking account balance inquiry," "deposit to checking account," "deposit to savings account" or the like. A ranked list, including classifier scores, for feature vector V1 shown in FIG. 4, might be:

(1) classifier score 0.92, checking account balance inquiry
(2) classifier score 0.53, deposit to checking account
(3) classifier score 0.02, savings account balance inquiry
(4) classifier score 0.01, deposit to savings account
(5) classifier score 0.00, transfer funds from savings account to checking account
(6) classifier score 0.00, client change of address.

A caller's call associated with feature vector V1 might then be sent to the class "checking account balance inquiry," which has the highest-ranking class.

Figure 6:
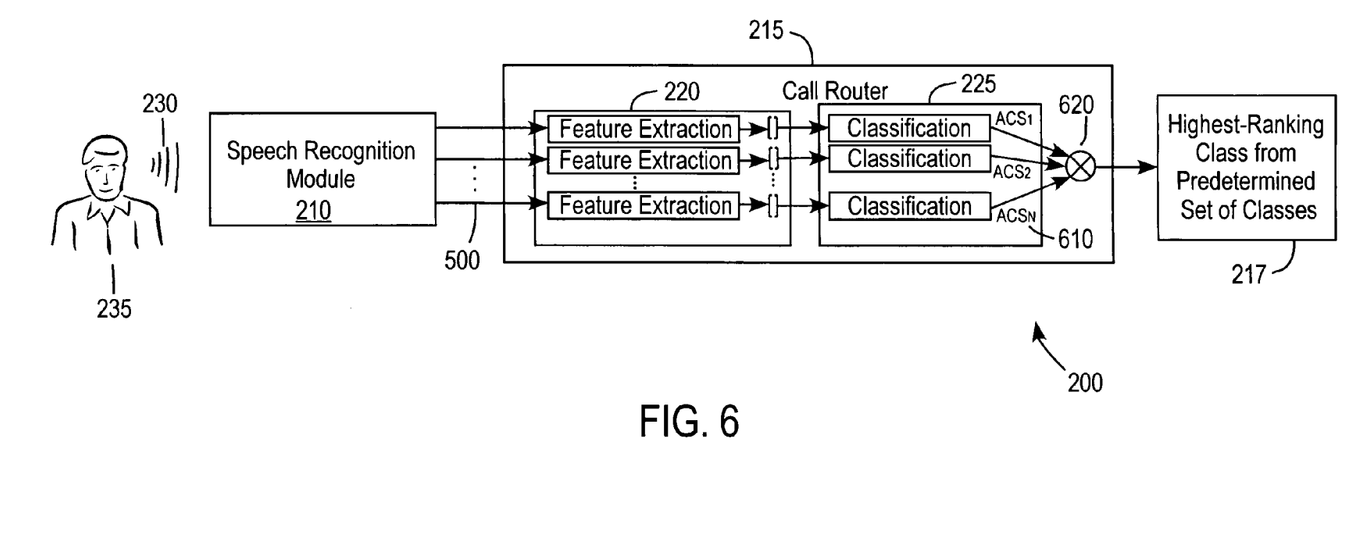
FIG. 6 is a simplified block diagram of call-routing system illustrating a flow of information through the call-routing system according to another embodiment.

FIG. 6 is a simplified block diagram of call-routing system 200 showing a flow of information through the system according to another embodiment. This embodiment differs from those described above in that feature vectors 550 are not summed to generate a final feature vector that is transferred to classification module 225. Instead, each feature vector of set 550 is transferred to the classification module and ranked in a unique ranked list of classes (similar to the example ranked list shown above). Each class in each ranked list is assigned a classifier score generated by the classification module. Classifier scores determine the rank of classes in their respective ranked lists. A final-ranked list may then be generated by summing the classifier scores for each class to generate a final-classifier score for each class. Classes may then be ranked in the final-ranked list according to their final-classifier scores. A caller's call may be forwarded to the class having the highest final-classifier score.

According to one embodiment, classifier scores in each ranked list may be weighed with speech-recognition scores 610 (abbreviated ACSs in FIG. 6). Speech-recognition scores are generated by speech-recognition module 210 for each of the nbest sequences of words. Recall that a speech-recognition score may be generated for each word in a sequence of words recognized by speech-recognition module 210. Recall also that a speech-recognition score for a feature or an nbest sequence of words may be an average of the speech-recognition scores for the words forming the feature or nbest sequence of words. Subsequent to being weighted with speech-recognition scores, the classifier scores may be summed by a summation module 620 to generate final-classifier scores. The final-classifier scores may be combined to form a final-ranked list. After the final-classifier scores are generated, a caller's call might be forwarded to the class having the highest-final-classifier score.

According to one embodiment, final-classifier scores may be generated from the following formula:

$$\text{final\_classifier\_score}(\text{class}\_i) = \sum_{j=1}^{n} \text{classifier\_score}\_j(\text{class}\_i)^{\alpha} \cdot \text{accoustic\_confidence\_score}\_j^{\beta},$$

wherein class_i is a given class for which a final-classifier score is calculated, the sum is over all of the nbest sequences of words, the classifier_score_j(class_i) is the classifier score for the given class associated with the jth nbest sequence of words, and the acoustic_confidence_score_j is the speech-recognition score for the jth nbest sequence of words, and $\alpha$ and $\beta$ are tunable parameter that can be used to place greater or lesser influence on classifier scores or speech-recognition scores.

Automatic Selection of Features of Interest

Figure 7:
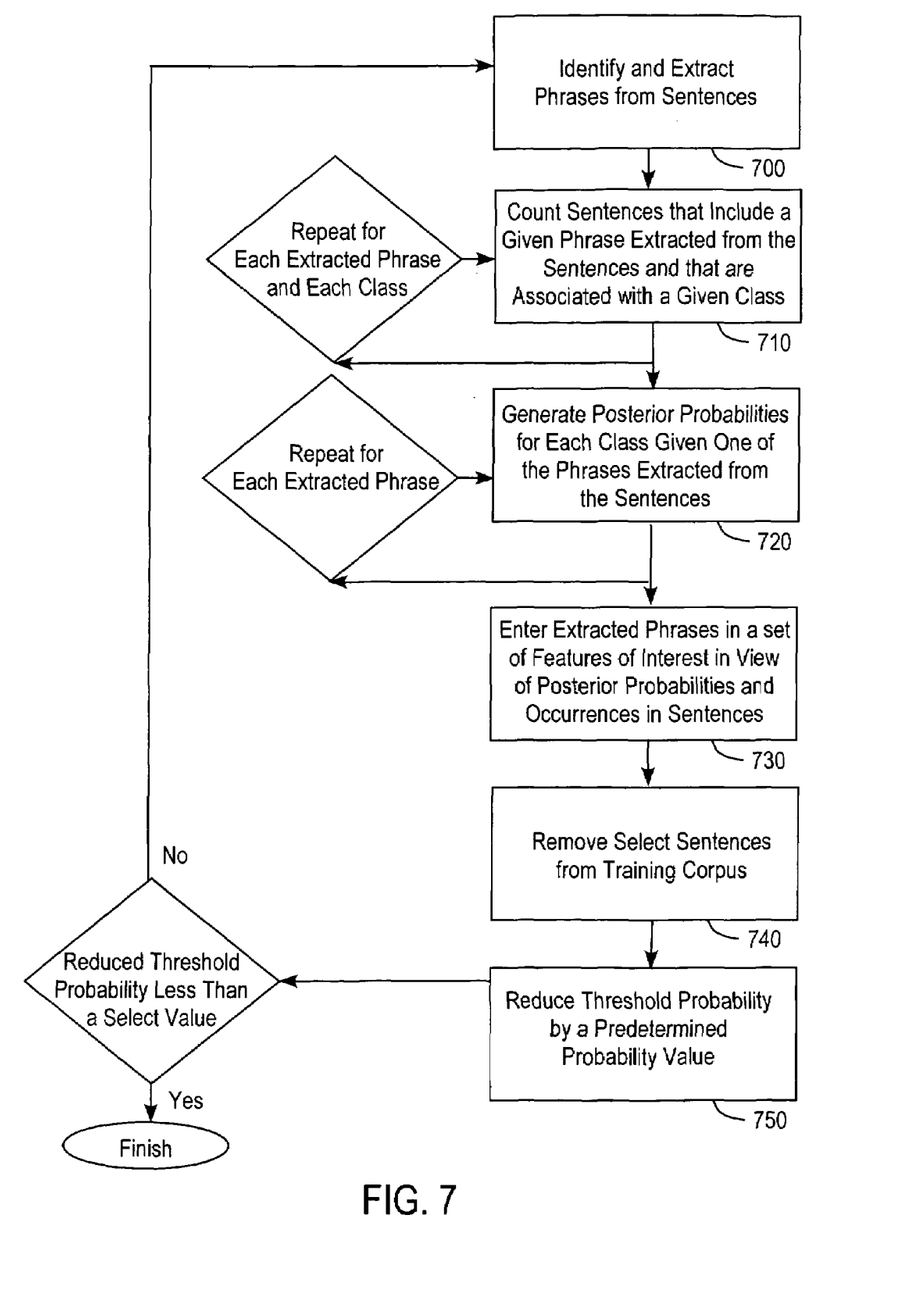
FIG. 7 is a high-level flow chart that includes steps for selecting features of interest from a set of sentences according to an embodiment of the present invention.

According to one embodiment, features of interest are automatically selected from a training corpus that includes example sentences that are associated with correct classes. The sentences may be derived from a set of utterances spoken by set of speakers. Once selected, the features of interest may be included in a set of predefined features and used in feature-extraction module 220 to extract these features from utterances spoken by callers. A method for selecting features of interest from a set of sentences is described in conjunction with a high-level flow chart shown in FIG. 7. It should be realized that the steps shown in FIG. 7 are not limiting on the invention as recited in the claims. Other techniques having fewer, substitute, and/or additional steps are within the purview of the invention and will be readily apparent to those of skill in the art. At 700, phrases having a number of words or letters less than a predetermined fixed number are identified and extracted from a set of sentences forming a training corpus. Each sentence is associated with a predetermined-correct class. That is, a caller speaking a sentence included in the training corpus should be directed to the predetermined-correct class associated with the sentence. An example of a sentence having a predetermined-correct class and that may be included in the training corpus of a banking application may be "I'd like to check the account balance of my checking account." A predetermined-correct class for this sentence may be "checking account balance inquiry." Trie data structures or the like may be used to identify and extract phrases from the training corpus. At 710, sentences that include a given phrase extracted from the training corpus and that are associated with a given class are counted. Step 710 is repeated for each phrase extracted from the training corpus in step 700 and for each class. At 720, a posteriori probabilities are generated for each class given one of the phrases extracted from the training corpus. Step 720 may be repeated for each phrase extracted from the sentences in step 700. According to one embodiment, an a posteriori probability for a class given a phrase is calculated by dividing a number of times the phrase is repeated in a sentence wherein the sentence is associated with the class divided by a number of times the phrase occurs in all of the sentences forming the training corpus. At 730, if phrases have a posteriori probabilities greater than a threshold probability and occur in the sentences greater than a threshold number of times, then the phrases are identified as features of interest and are entered in the set of predetermined features. At 740, all sentences that include the phrases identified at step 730 are removed from the training corpus, thereby generating a reduced-training corpus. At 750, the threshold probability is reduced by a probability value. If the threshold probability reduced by the probability value is greater than or equal to a pre-determined probability value, then steps 700–750 are repeated using the reduced training corpus. Otherwise, if the threshold probability reduced by the probability value is less than the pre-determined probability value, then steps 700–750 are not repeated.

According to one embodiment, prior to executing steps 700–750, non-informative words and/or phrases are removed from the sentences. Generally, non-informative words and phrases do not add relevant and informative information to the sentences. Words and phrases that are non-informative may include words and phrases, such as "thank you," "please," and the like. According to one embodiment, non-informative words may also include indefinite articles, definite articles, conjunctions and the like.

According to another embodiment, prior to executing steps 700–750, pause-fillers are removed from the sentences. Pause-fillers include words speakers use as delays when speaking, such as "um", "ah," "hum," "uh" and the like.

According to another embodiment, prior to executing steps 700–750, words and/or phrases may be replaced with synonymous words and/or phrases. For example, morphological processing may be performed to replace plural words (e.g., plural nouns and verbs) with singular words. Morphological processing may also be performed to replace groups of words with fewer words having a synonymous meaning.

Classification Module Training

Classification module 225 may be implemented using a variety of classification schemes and systems. For example, classification module 225 may be implemented in decision trees, support-vector machines, neural networks and the like. In a particular embodiment of classification module 225 that includes a neural network, the neural network may be trained using a set of sentences associated with correct classes that are predetermined for the sentences. The sentences may be derived from utterances spoken by a set of speakers. For example, the sentence "I would like to check the account balance of my checking account" may be associated with the correct class "checking account balance inquiry." A correct class is deemed correct in that a caller speaking the sentence should be directed to the correct class.

Figure 8A:
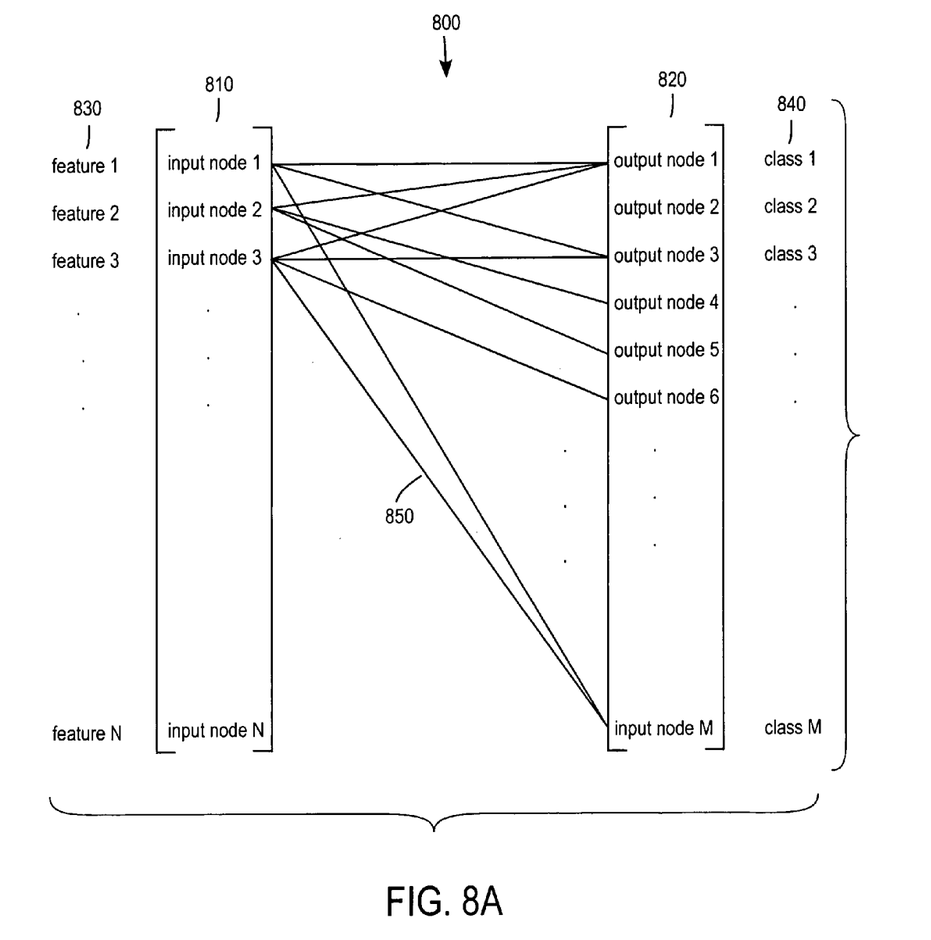
FIG. 8A shows an example of a neural network that has been trained according to a method of the present invention.

According to one embodiment, a neural network 800 (see FIG. 8A) included in classification module 225 includes a single layer having a set of input nodes 810 that are associated with a set of features 830 and includes a set of output nodes 820 that are associated with a set of classes 840. Each feature from the set of features is associated with a unique input node, and each class is associated with a unique output node. Connections 850 associate select input nodes to select output nodes in the neural network.

Figure 8B:
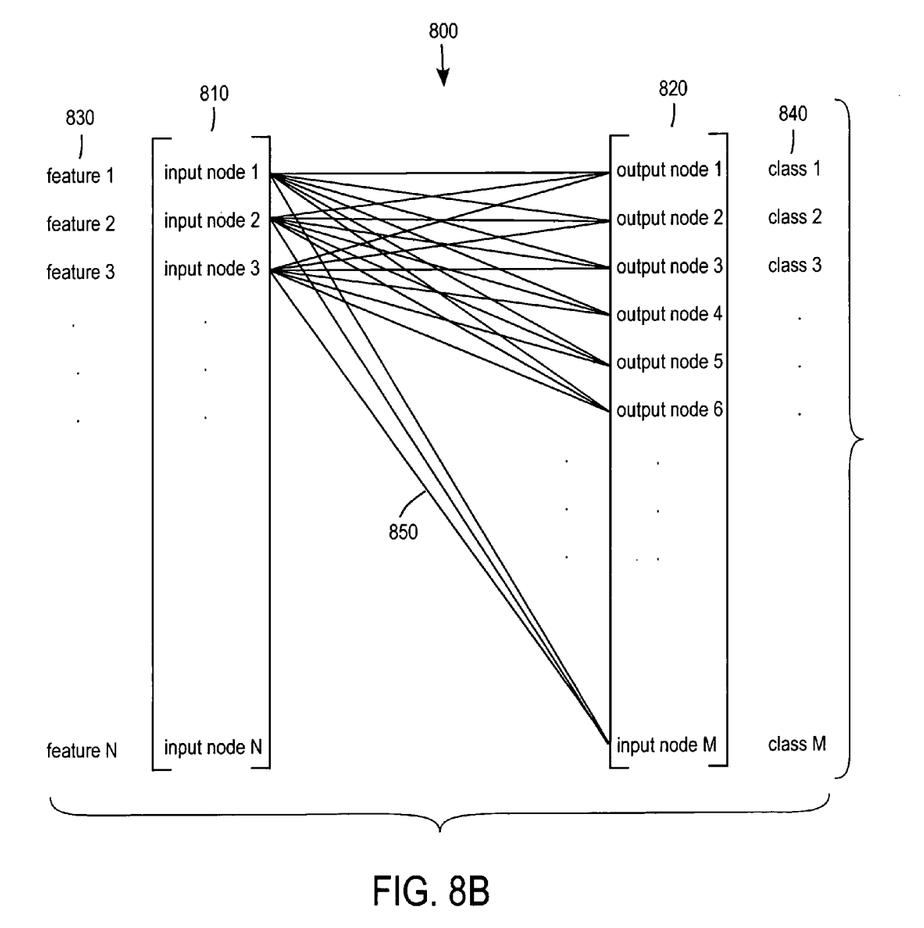
FIG. 8B shows an example of the neural network prior to training.

Prior to training, neural network 800 is fully connected. That is, each input node is connected to each output node by a set of connections 850' (see FIG. 8B). During a training session, connections are selectively removed from the set of connections 850' to form, for example, a set of connections 850 shown in FIG. 8A. Removal of a connection depends on attributes of sentences (e.g., a training corpus of sentences) used to train neural network 800. Removal of connections will be presently described in detail.

Figure 8C:
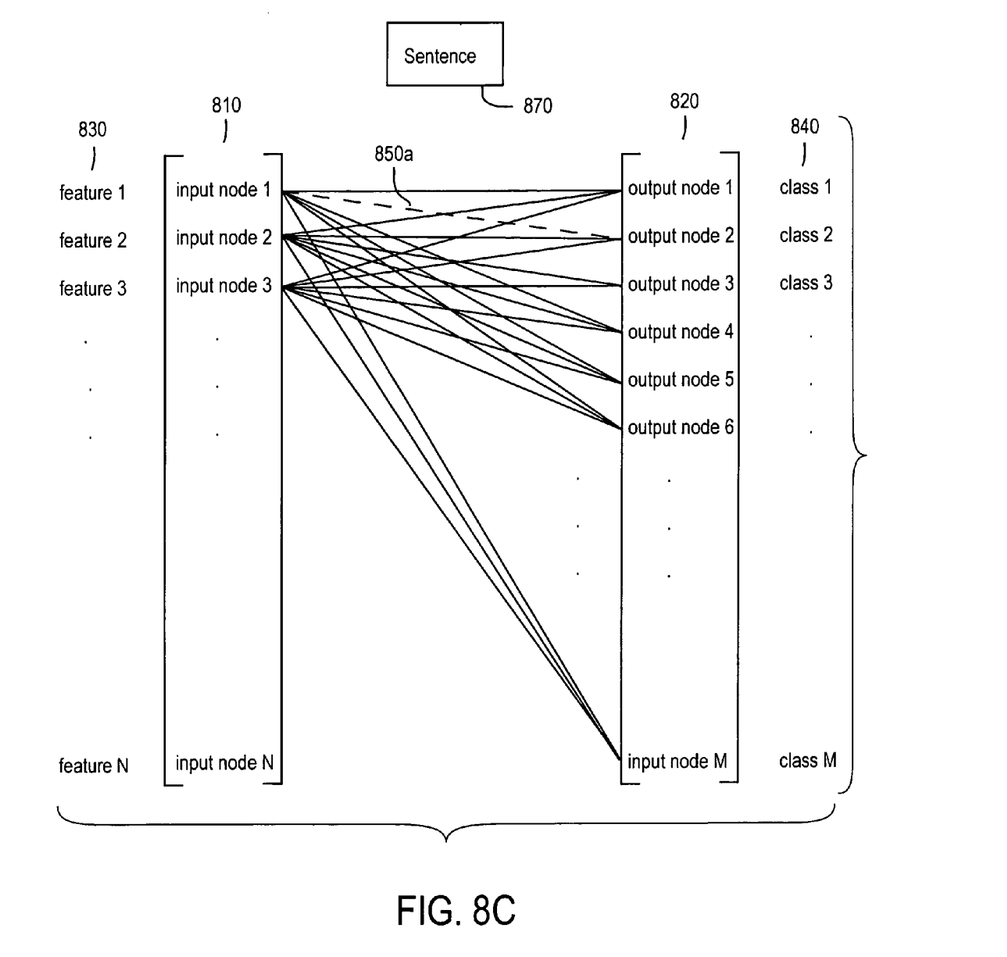
FIG. 8C shows an example of a connection that has been removed from the neural network.
Figure 9:
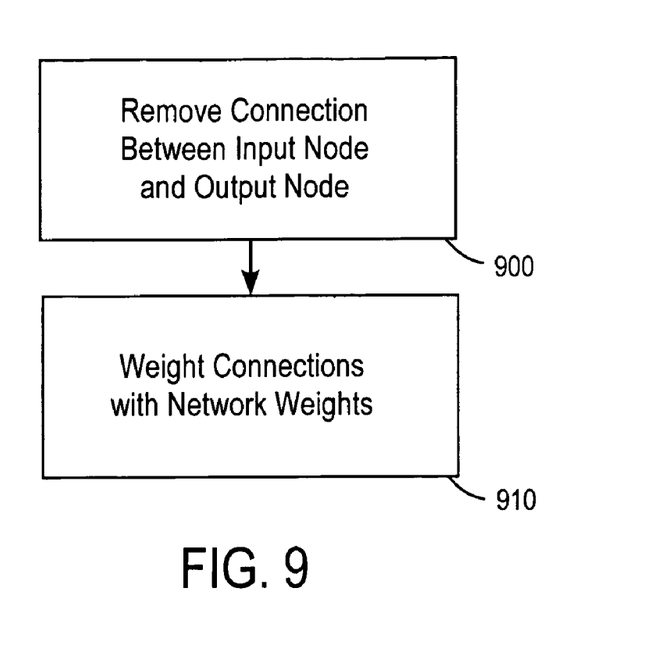
FIG. 9 shows a high-level flow chart that includes steps for training a neural network according to an embodiment of the present invention.

FIG. 9 shows a high-level flow chart having steps for training neural network 800 according to an embodiment of the present invention. It should be realized that the steps shown in FIG. 9 are not limiting on the invention as recited in the claims. Other techniques having fewer, substitute, and/or additional steps are within the purview of the invention and will be readily apparent to those of skill in the art. A training corpus that includes a number of sentences is used for training the neural network. Each sentence in the training corpus is associated with a class of the neural network. At step, 900 a connection is removed between an input node associated with a given feature and an output node associated with a given class if the total number of times the given feature occurs in a set of sentences, which are associated with the given class, is less than a threshold number (e.g., one). FIG. 8C shows an example of a connection 850a (shown as dashed) that associates input node 1 and output node 2 that may be removed if feature 1 associated with input node 1 occurs less than a threshold number of times (e.g., one) in a set of sentences 870, which is associated with class 2. At 910, the connections are weighted with a set of network weights. Each network weight is derived from a function of a term-frequency and an inverse-document frequency. A term-frequency is the number of sentences included in a training corpus that are associated with a given class and contain a given feature. An inverse-document frequency is the inverse of the number of classes that are associated with at least one sentence that contains the given feature. Networks weights "W" may be derived from the function: W=term-frequency·log(N·inverse-document frequency), wherein N is the total number of classes for the neural network. After the connections are weighted, the neural network may be further trained using standard-neural-network-training-iteration methods. Such standard-neural-network-training-iteration methods are well known to those of skill in the art and will not be discussed in detail.

According to one embodiment, sentences forming a training corpus include transcriptions and text of utterances spoken by a set of speakers. Transcriptions are manually generated from the utterances. For example, transcriptions may be transcribed by a transcriptionist who listens to a set of utterances and transcribes the words therein. Text of the utterances are automatically generated by speech-recognition module 210 or other automatic speech recognition (ASR) tool, which may be configured to generate one or nbest text of the utterances. Transcriptions and/or text may be weighted prior to training to place a greater emphasis on either the transcriptions or text. Optimal weighting values for the transcriptions and/or text may be experimentally determined.

According to one embodiment, sentences (e.g., transcriptions and/or text) forming a training corpus are transferred to feature-extraction module 220, which generates a training vector for each sentence. Each sentence, and training vector associated therewith, is associated with a known class of the neural network. The training vectors may be used to automate training of classification module 225. For example, the training vectors may be transferred to the classification module operating in a training mode. In training mode, the classification module is configured to extract features from the training vectors in order to remove connections from a neural network and thereby train the neural network. Criteria similar to those described above may be used to train the neural network. For example, a connection in the neural network may be removed between an input node associated with a given feature and an output node associated with a given class if the total number of times the given feature is extracted from a set of training vectors, which are associated with the given class, is less than a threshold number (e.g., one). Sets of training vectors associated with transcriptions and text of sentences may be weighted to place more emphasis on training vectors associated with transcriptions or on training vectors associated with text. The connections of the neural network may be weighted with a set of network weights as described above. As described above, each network weight may be derived from a function of a term-frequency and an inverse-document frequency. After the connections are weighted, the neural network may be further trained using standard-neural-network-training-iteration methods. Such standard-neural-network-training-iteration methods are well known to those of skill in the art and will not be discussed in detail.

CONCLUSION

It is to be understood that the examples and embodiments described above are for illustrative purposes only and that various modifications or changes in light thereof will be suggested to persons skilled in the art and are to be included within the spirit and purview of this application and scope of the appended claims. For example, while call-routing systems have been characterized herein as being of use to route telephone calls, call-routing system described herein may be used in a variety of applications such as, routing spoken-internet queries to web destinations, routing spoken queries in an information retrieval systems and the like. Moreover, while call-routing systems have been described as being implemented in software, call-routing systems according to embodiments of the present invention may be implemented in hardware, firmware, software and the like and may be implemented in combinations of the foregoing. Therefore, the above description should not be taken as limiting the scope of the invention as defined by the claims.

What is claimed is:

1. A computerized method for electronically directing a call to a class, such that an utterance spoken by a speaker and received by a call-routing system is classified by the call-routing system as being associated with the class, such that the call-routing system includes a speech-recognition module, a feature-extraction module, and a classification module, the method comprising:
   extracting features from recognized speech;
   weighting elements of a feature vector with respective speech-recognition scores, wherein each element is associated with one of the features and each element is a number of times the element's associated feature is included in the recognized speech;
   ranking classes to which the features are associated based at least in part on the elements of the feature vector; and
   electronically directing the call to a highest-ranking class.

2. The method of claim 1, wherein ranking classes includes generating a score for each class and ranking the classes in a ranked list of the classes, and wherein the scores determine the ranking of the classes in the ranked list.

3. The method of claim 1, further comprising generating the recognized speech from the utterance.

4. The method of claim 1, further comprising generating speech-recognition scores for the features.

5. The method of claim 1, wherein generating speech-recognition scores for the features includes generating a confidence score for each word of the recognized speech.

6. The method of claim 5, wherein a confidence score for a feature that includes a phrase is an average of the speech-recognition scores for each word forming the phrase.

7. The method of claim 5, wherein a confidence score for a feature that includes a word is the confidence score for the word.

8. The method of claim 1, wherein the confidence scores are in the range of 0 to 1.

9. A computerized method for electronically directing a call to a class, such that an utterance spoken by a speaker and received by a call-routing system is classified by the call-routing system as being associated with the class, such that the call-routing system includes a speech-recognition module, a feature-extraction module, and a classification module, the method comprising:
   extracting sets of features from respective speech-recognition results;
   generating a feature vector for each set of features, wherein:
      each feature vector includes a set of elements,
      each element of a feature vector is associated with a corresponding one of the features in the sets of features associated with the feature vector, and
      each element is a number of times the element's associated feature is included in an associated speech-recognition result;
   weighting elements of each feature vector with respective weighting factors;
   summing the feature vectors to generate a final feature vector;
   ranking classes associated with the features based on the final feature vector; and
   electronically directing the call to a highest-ranking class.

10. The method of claim 9, further comprising deriving the speech-recognition results from the utterance.

11. The method of claim 10, wherein the speech-recognition results are generated by the speech-recognition module.

12. The method of claim 9, wherein the speech-recognition results are a set of nbest speech-recognition results.

13. The method of claim 9, further comprising generating the weighting factors for the features.

14. The method of claim 9, further comprising deriving the weighting factors from speech-recognition scores for words in the recognized speech results.

15. The method of claim 14, wherein each weighting factor is generated from the equation $$W[i] = \frac{\exp[\alpha(\text{l\_score}(i) - \text{max\_l\_score})]}{\sum_{j=1}^{N} \exp[\alpha(\text{l\_score}(j) - \text{max\_l\_score})]},$$

wherein 1_score(i) is the speech-recognition score of for a given sequence of words for which a weight is generated, max_1_score is a maximum speech-recognition score of the nbest sequences of words, 1_score(j) is the acoustic confidence for a jth nbest sequence of words, and $\alpha$ is a tunable parameter.

16. The method of claim 9, wherein an acoustic-confidences score for a feature that includes a word is the speech-recognition score for the word.

17. The method of claim 16, wherein in the speech-recognition scores are in the range of 0 to 1.

18. A computerized method for electronically directing a call to a class, such that an utterance spoken by a speaker and received by a call-routing system is classified by the call-routing system as being associated with the class, such that the call-routing system includes a speech-recognition module, a feature-extraction module, and a classification module, the method comprising:
   extracting sets of features from respective speech-recognition results;
   generating a feature vector for each set of features, wherein:
      each feature vector includes a set of elements,
      each element of a feature vector is associated with a corresponding one of the features in the sets of features associated with the feature vector, and
      each element is a number of times the element's associated feature is included in an associated speech-recognition result;
   generating a ranked list for each feature vector based at least in part on the elements of each feature vector;
   combining the ranked lists; and
   electronically directing the call to a highest scoring class.

19. The method of claim 18, wherein the speech-recognition results are generated by the speech-recognition module based on the utterance.

20. The method of claim 18, wherein the speech-recognition results include a set of nbest speech-recognition results.

21. The method of claim 18, further comprising generating a classifier score for each class in each ranked list.

22. The method of claim 21, further comprising weighting each classifier score with a speech-recognition score.

23. The method of claim 18, wherein combining the ranked lists includes generating final-classifier scores, and wherein the highest scoring class has a highest-final-classifier score.

24. The method of claim 23, wherein the final-classifier scores are derived from the formula:

$$\text{final\_classifier score}(\text{class}\_i) = \sum_{j=1}^{n} \text{classifier\_score}\_j(\text{class}\_i)^{\alpha} \cdot \text{accoustic\_confidence\_score}\_j^{\beta},$$

wherein class_i is a given class for which a final-classifier score is calculated, the sum is over nbest sequences of words, the classifier_score_j(class_i) is a classifier score for a class associated with a jth nbest sequence of words, and the acoustic_confidence_score_j is the speech-recognition score for the jth nbest sequence of words, and $\alpha$ and $\beta$ are tunable parameter used to place emphasis on the classifier_scores_j or the acoustic_confidence_scores_j.

25. A call-routing system for electronically directing a call to a class, the system comprising:
   a speech-recognition module configured to generate nbest sequences of words based on an utterance spoken by a caller;
   a feature-extraction module configured to generate features vectors for the nbest sequences of words, wherein:
      each feature vector includes a set of elements,
      each element of a feature vector is associated with a corresponding one of the features of the feature vector, and
   each element is a number of times the element's associated feature is included in an associated speech-recognition result in the nbest sequences of words; and
   a classification module configured to form a ranked list of classes for the feature vectors based at least in part on the elements of each feature vector, and direct the call to a highest-ranking class in the ranked list of classes.

26. The system of claim 25, wherein the classification module is further configured to generate a set of ranked lists for the feature vectors, and wherein the first mentioned ranked list is a summation of the ranked lists of the set of ranked lists.

27. The system of claim 26, wherein the classification module is configured to weight the ranked lists of the set of ranked lists with weighting factors.

28. The system of claim 27, wherein the weighting factors are calculated from the equation $$W[i] = \frac{\exp[\alpha(\text{l\_score}(i) - \text{max\_l\_score})]}{\sum_{j=1}^{N} \exp[\alpha(\text{l\_score}(j) - \text{max\_l\_score})]},$$

wherein l_score(i) is the speech-recognition score of for a given sequence of words for which a weight is generated, max_l_score is a maximum speech-recognition score of the nbest sequences of words, l_score(j) is the acoustic confidence for a jth nbest sequence of words, and $\alpha$ is a tunable parameter.

29. The system of claim 25, wherein the feature-extraction module is configured to weight elements of the feature vectors with acoustic-confidences scores and sum the feature vectors to form a final feature vector.

30. The system of claim 29, wherein the classification module is configured to form the ranked list from the final feature vector.

* * * * *